Figure 1:
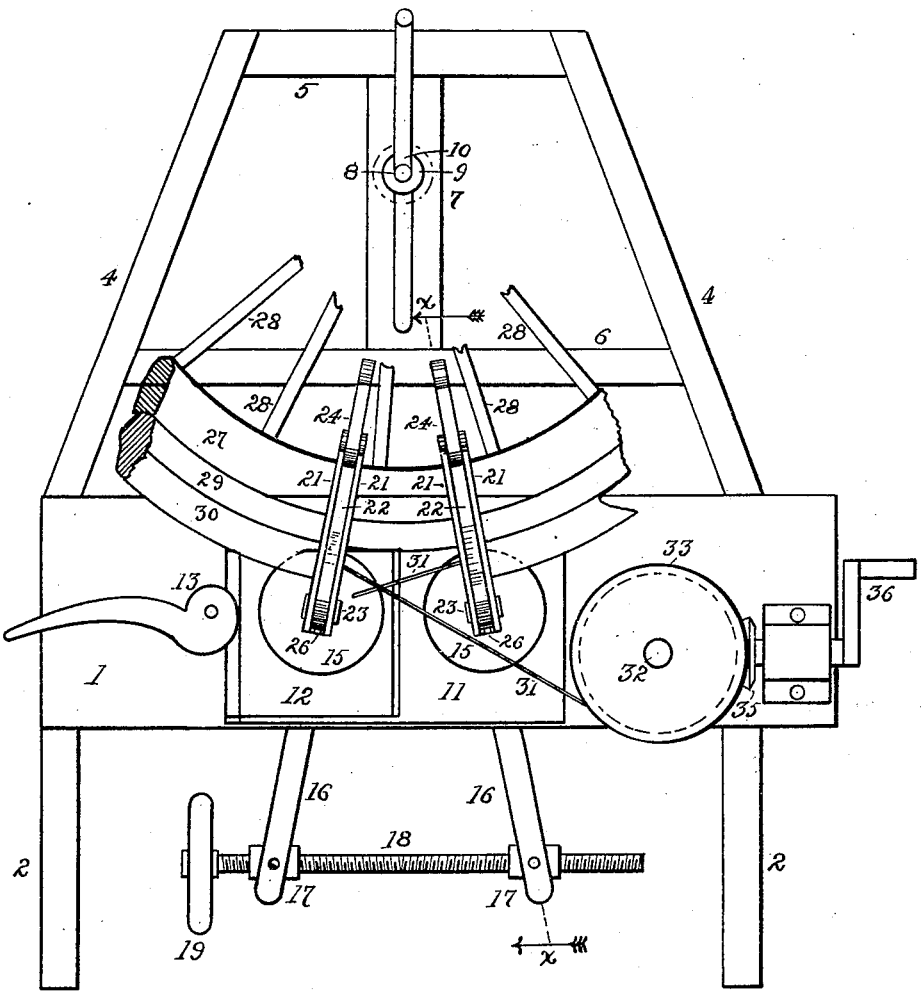

No. 680,312. Patented Aug. 13, 1901.
J. A. BURROWS.
RUBBER TIRE SETTING MACHINE.
(Application filed Feb. 16, 1900. Renewed Apr. 26, 1901.)

(No Model.) 2 Sheets—Sheet 1.

Witnesses:
Inventor:
Joseph A. Burrows,
By Humphrey & Humphrey,
Attorneys.

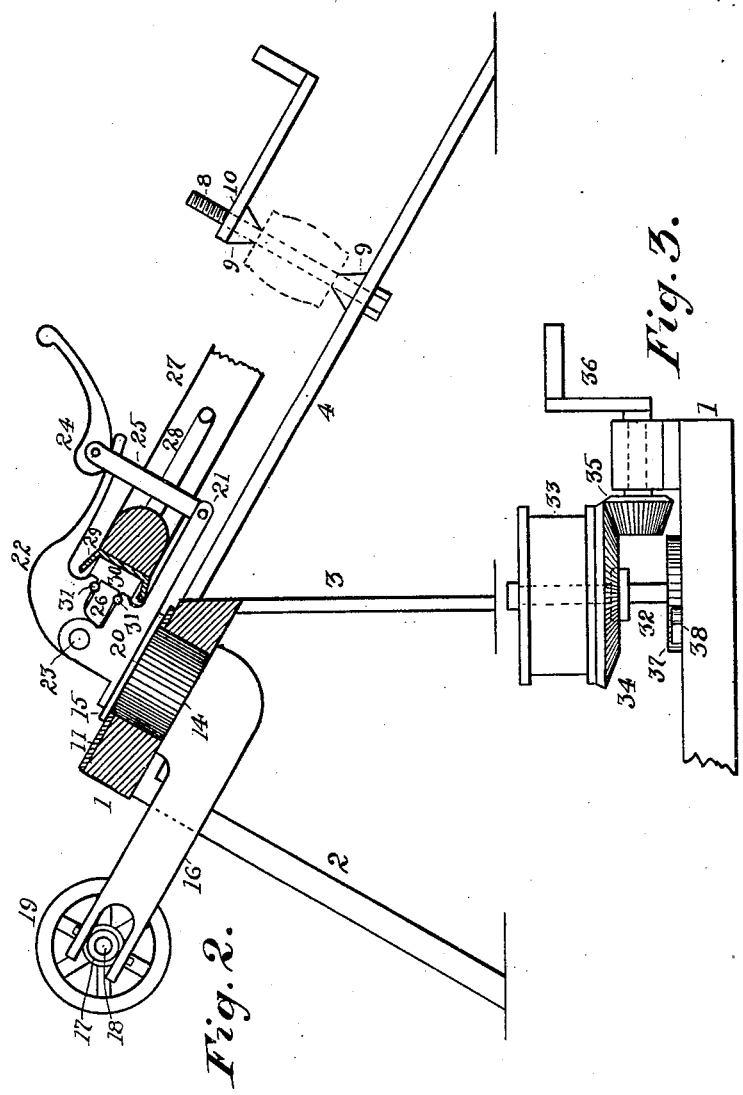

UNITED STATES PATENT OFFICE.

JOSEPH A. BURROWS, OF AKRON, OHIO.

RUBBER-TIRE-SETTING MACHINE.

SPECIFICATION forming part of Letters Patent No. 680,312, dated August 13, 1901.

Application filed February 16, 1900. Renewed April 26, 1901. Serial No. 57,619. (No model.)

*To all whom it may concern:*

Be it known that I, JOSEPH A. BURROWS, a citizen of the United States, residing at Akron, in the county of Summit and State of Ohio, have invented a certain new and useful Improvement in Rubber-Tire-Setting Machines, of which the following is a specification.

My invention has relation to improvements in machines for setting solid rubber tires having embedded longitudinal wires in channeled metallic tires mounted on the wheel-felly.

The object of my invention is to provide a compact and simple apparatus by which the rubber tire may be pushed back on the inner wires sufficiently to permit the ends of the wire to be united, and the wire may be first drawn tightly to cause the rubber to hug the channeled tire, and the ends may be drawn substantially tangential to the tire into contact for uniting.

To the aforesaid object my invention consists in the peculiar and novel construction, arrangement, and combination of parts hereinafter described and then specifically pointed out in the claim, reference being had to the accompanying drawings, which form a part of this specification.

In the accompanying drawings, in which similar reference-numerals indicate like parts in the different views, Figure 1 is a plan in a plane perpendicular to the axes of certain revoluble parts hereinafter described, illustrating the operation of the machine; Fig. 2, a side elevation and partly in section at the line X X of Fig. 1, and Fig. 3, a detached side elevation of the drum and turning mechanism for first winding the wire and drawing it taut preparatory to applying the final tightening devices.

Referring to the drawings, 1 is a firm table, of wood, supported at the back by two diagonal legs 2 2 and two vertical legs 3 3 to secure firmness and rigidity. From the front of the table 1 and firmly secured thereto is a frame composed of converging side bars 4, united at their ends and intermediately by cross-bars 5 and 6 and having between the bars 5 and 6 a slotted bar 7. Adjustably fastened in the slotted bar 7 is a bolt 8, bearing cones 9 9, apexes adjacent to each other, and nut 10, with a crank-handle by which it may be turned. On top of the table 1 is securely fastened a metallic plate 11, the left half of which, as appears in Fig. 1, is nearly cut away, leaving side strips, in which is fitted to slide a smaller plate 12, arranged to be moved and held by a cam 13, pivotally mounted in the table 1 and provided with a handle by which it may be operated. Through the table 1 and plate 11 is a circular opening perpendicular to the table to form a bearing for a short journal, to be described. In the sliding plate 12 is a similar opening and for a like purpose; but the opening in the table beneath is slotted to permit of the journal sliding with the plate. Mounted to revolve in these openings are two like short journals 14, having top flanges 15, that rest on the plates, one only of which is shown in Fig. 2, and to the lower end of which are secured like arms 16, extending rearwardly and having forked ends in which are pivotally mounted nuts 17, that run on a right and left handed screw shaft 18, bearing a hand-wheel 19, by which it is turned. On the top of each journal 14 is secured a head 20, from the front of which extend two parallel arms 21 and from the top two ears, between which is pivotally mounted a lever 22 by means of a pivot-bolt 23. The end of the lever 22 is arranged to be pressed down by a cam 24, pivotally mounted between links 25, connected at their lower ends with the ends of the arms 21. Between the end of the lever 22 and the head 20 is mounted an independent piece 26, which has in its upper and lower faces grooves that register with corresponding grooves in the adjacent faces of the lever 22 and the heads 20 to form gripping devices to hold the wires of the tire. On one end of the table 1 is journaled a shaft 32, on which is mounted a drum 33, having on its lower face a bevel-gear 34, that meshes in a bevel-pinion 35 on a shaft arranged to be turned by a crank 36. On the lower end of the shaft 32 is a ratchet-wheel 37, arranged to be engaged by a pawl 38.

In operation the bolt 8 is adjusted to the proper position for the size of wheel on which the tire is to be placed, and the wheel is mounted thereon, as shown partially in Figs. 1 and 2, in which 27 is the felly, 28 the spokes, 29 the metallic tire, and 30 the rubber tire. The wires 31, extending from one end of the tire, are then grasped by one of the gripping devices, the right one shown in Fig. 1, and the opposite end of the wires passed between the gripping-surfaces of the other device and carried to and wound on the drum 33 and drawn tightly, thus binding the rubber tire in the channel as snugly as experience will dictate is proper in this step. The wire thus drawn is then secured in the opposite gripping device and severed between it and the drum, leaving such length projecting from the tire as will afford a sufficient lap with the ends extending from the opposite end of the tire. To bring these wires in tangential alinement, so as to make them lie as nearly as may be in the arc of the tire, the screw 18 is turned to draw the outer ends of the arms 16 together until the wires at their points of intersection are in the desired position. If any relaxing of the tension in the wires is thus produced, the cam 13 is turned as far as may be necessary, thus forcing the plate 12, with its clamping mechanism, toward the other clamp. The ends of the wires are then united by brazing or other suitable process. This part of the process is facilitated, as well as the other steps, by the inclined position of the machine, which presents advantages for reaching and operating on the joint over either the horizontal or perpendicular position of the wheel and is especially useful in allowing the use of the blowpipe in brazing and the escape of any dirt or residuum that might otherwise fall in the channel of the tire. When the union of the wires is perfected, the clamps are released and the ends of the rubber tire worked together by any of the well-known devices for that purpose, when they are cemented, the nut 10 released, and the wheel, with its rubber tire, removed.

Having thus described my invention, what I claim, and desire to secure by Letters Patent, is—

In a rubber-tire-setting machine the combination with an inclined supporting-table and a frame having adjustable means for holding a wheel-hub, of journals mounted and adapted to turn in bearings in said table having gripping devices to seize the wires of a rubber tire, and radial arms with pivoted nuts, a right and left handed screw to swing said arms, a windlass to draw the wires from one direction, and means for moving one of said journal-bearings to and from the other, substantially as shown and described.

In testimony that I claim the above I hereunto set my hand in the presence of two subscribing witnesses.

JOSEPH A. BURROWS.

In presence of—
C. E. HUMPHREY,
C. P. HUMPHREY.